United States Patent Office 2,910,486
Patented Oct. 27, 1959

2,910,486

10-HYDROXYESTRA-1,4-DIENE-3,17-DIONE AND ACETATE

James Jiu, Morton Grove, Ill., assignor to G. D. Searle & Co., Chicago, Ill., a corporation of Delaware No Drawing. Application December 20, 1957
Serial No. 703,997

3 Claims. (Cl. 260—397.4)

This invention relates to 10-hydroxyestra-1,4-diene-3,17-dione, its acetate, and processes for the manufacture thereof. More particularly, this invention relates to products of the formula

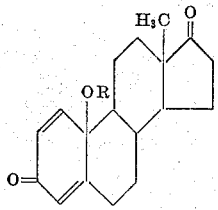

wherein R represents hydrogen or an acetyl radical.

Products of this invention are useful because of their valuable pharmacological properties. For example, they manifest estrogenic activity, in addition to which they appear to produce an anti-progesterone response in the animal body.

Manufacture of the subject compositions proceeds from estrone, which, heated with lead tetraacetate in the presence of glacial acetic acid, affords the 10-acetoxy-1,4-diene hereof. This material, in turn, on careful hydrolysis with methanolic alkali bicarbonate, produces the corresponding alcohol.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted.

Example 1

*10-acetoxyestra-1,4-diene-3,17-dione.*—To a suspension of 80 parts of estrone in 2000 parts of glacial acetic acid maintained at less than 30° C. is added, portionwise over a 10-minute period with agitation, 329 parts of lead tetraacetate. Agitation in the specified temperature range is continued for an additional 20 minutes, at which point the reaction mixture is dumped into ice water. This mixture, in turn, is extracted with chloroform and the chloroform extract dried over anhydrous sodium sulfate. Evaporation of solvent under reduced pressures leaves a residue which is purified by chromatography on magnesium silicate, using a 4:1 volumetric ratio of benzene to hexane as developing solvent. There is obtained by this means 10-acetoxyestra-1,4-diene-3,17-dione, which, recrystallized from methanol, melts at 255–258° C. The product has the formula

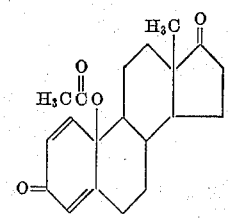

Also isolated in the chromatography work up is 4,4-diacetoxyestra-1,5(10)-diene-3,17-dione, a compound somewhat less firmly adsorbed on the magnesium silicate, and which, likewise recrystallized from methanol, melts in the range, 206–212° C.

Example 2

*10-hydroxyestra-1,4-diene-3,17-dione.*—A solution of 3 parts of 10-acetoxyestra-1,4-diene-3,17-dione in approximately 100 parts of saturated methanolic potassium bicarbonate is heated at the boiling point under reflux for 1 hour, the reaction being carried out in a nitrogen atmosphere. Upon completion of the heating period, the reaction mixture is dumped onto ice and made acid with dilute muriatic acid. The resultant mixture is extracted with chloroform. The chloroform extract is washed with water and then dried over anhydrous sodium sulfate. Evaporation of solvent leaves a residue which, crystallized from ethyl acetate, affords 10-hydroxyestra-1,4-diene-3,17-dione, the melting point of which is 215–218° C. The product has the formula

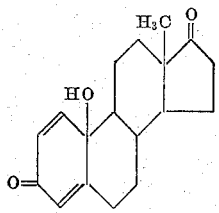

What is claimed is:
1. A compound of the formula

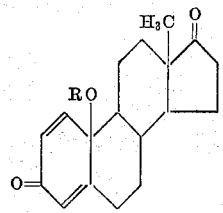

wherein R is selected from the group consisting of hydrogen and the acetyl radical.
2. 10-acetoxyestra-1,4-diene-3,17-dione.
3. 10-hydroxyestra-1,4-diene-3,17-dione.

References Cited in the file of this patent

UNITED STATES PATENTS

| | | |
|---|---|---|
| 2,729,654 | Colton | Jan. 3, 1956 |
| 2,806,862 | Pederson et al. | Sept. 17, 1957 |

OTHER REFERENCES

Ringold et al.: J. Org. Chem., vol. 21 (February 1956), pages 239–40.